United States Patent
Kobayashi et al.

(10) Patent No.: US 12,189,450 B2
(45) Date of Patent: Jan. 7, 2025

(54) ELECTRONIC CONTROL UNIT AND METHOD FOR REDUCING POWER CONSUMPTION OF ELECTRONIC CONTROL UNIT

(71) Applicant: Hitachi Astemo, Ltd., Hitachinaka (JP)

(72) Inventors: Takuya Kobayashi, Hitachinaka (JP); Daisuke Furuya, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/023,856

(22) PCT Filed: Sep. 7, 2021

(86) PCT No.: PCT/JP2021/032873
§ 371 (c)(1),
(2) Date: Feb. 28, 2023

(87) PCT Pub. No.: WO2022/080041
PCT Pub. Date: Apr. 21, 2022

(65) Prior Publication Data
US 2023/0324973 A1     Oct. 12, 2023

(30) Foreign Application Priority Data
Oct. 12, 2020  (JP) .................... 2020-172025

(51) Int. Cl.
*G06F 1/3215*  (2019.01)
*B60W 10/06*  (2006.01)
(Continued)

(52) U.S. Cl.
CPC ........... *G06F 1/3215* (2013.01); *B60W 10/06* (2013.01); *B60W 10/08* (2013.01); *G06F 1/324* (2013.01)

(58) Field of Classification Search
CPC ...... G06F 1/3215; G06F 1/324; B60W 10/06; B60W 10/08; F02D 41/061; F02D 2250/12; F02D 41/26; F02D 41/0032; Y02D 10/00
See application file for complete search history.

(56) References Cited

U.S. PATENT DOCUMENTS

| | | | | |
|---|---|---|---|---|
| 6,088,661 A | * | 7/2000 | Poublon | .................. G01K 1/00 |
| | | | | 73/114.34 |
| 7,216,031 B2 | | 5/2007 | Nomura | |

(Continued)

FOREIGN PATENT DOCUMENTS

| | | |
|---|---|---|
| JP | 2008-269487 A | 11/2006 |
| JP | 2011-213337 A | 10/2011 |

(Continued)

OTHER PUBLICATIONS

International Preliminary Report on Patentability (PCT/IB/338 & PCT/IB/373) issued in PCT Application No. PCT/JP2021/032873 dated Apr. 27, 2023, including English translation of document C2 (Japanese-language Written Opinion (PCT/ISA/237), filed on Feb. 28, 2023) (eight (8) pages).

(Continued)

*Primary Examiner* — Faisal M Zaman
(74) *Attorney, Agent, or Firm* — Crowell & Moring LLP

(57) ABSTRACT

An electronic control unit includes a microcomputer configured to be started by a plurality of starting factors, in which different operation modes are associated with each of the starting factors, and a resource is associated with each of the operation modes. The microcomputer identifies a starting factor in an initialization process started by the starting factor, and selects and executes an operation mode associated with the starting factor identified. When another starting factor is generated during execution of the operation mode, (Continued)

the microcomputer stops execution of the operation mode and restarts, and then executes an operation mode associated with the other starting factor.

18 Claims, 14 Drawing Sheets

(51) Int. Cl.
  *B60W 10/08* (2006.01)
  *G06F 1/324* (2019.01)

(56) References Cited

U.S. PATENT DOCUMENTS

| | | | |
|---|---|---|---|
| 11,590,907 B2* | 2/2023 | Sugawa | H04L 67/12 |
| 2004/0267437 A1 | 12/2004 | Hosoya et al. | |
| 2005/0107964 A1 | 5/2005 | Wakairo | |
| 2005/0187681 A1* | 8/2005 | Suzuki | F02D 41/26 701/1 |
| 2006/0247835 A1* | 11/2006 | Nagata | F02D 41/266 701/36 |
| 2010/0004811 A1* | 1/2010 | Kannan | G07C 5/085 701/36 |
| 2013/0219199 A1* | 8/2013 | Roy | G06F 9/4418 713/300 |
| 2014/0365066 A1* | 12/2014 | Murase | F02D 41/22 701/30.8 |
| 2015/0346805 A1* | 12/2015 | Miyasaka | G06F 1/3284 710/14 |
| 2015/0377204 A1* | 12/2015 | Koyama | B60R 16/0239 701/113 |
| 2016/0203654 A1* | 7/2016 | Nishino | G07C 5/0825 701/33.4 |
| 2017/0293340 A1* | 10/2017 | Park | G06F 1/329 |
| 2018/0095638 A1* | 4/2018 | Merg | H04W 4/70 |
| 2018/0233933 A1* | 8/2018 | Makino | H02J 9/002 |
| 2020/0189395 A1* | 6/2020 | Takahashi | B60L 3/04 |
| 2021/0157388 A1* | 5/2021 | Kulandaivel | H04L 12/40032 |

FOREIGN PATENT DOCUMENTS

| | | |
|---|---|---|
| JP | 2012-11888 A | 1/2012 |
| JP | 2016-11028 A | 1/2016 |
| JP | 2017-45125 A | 3/2017 |
| JP | 2018-131030 A | 8/2018 |
| JP | 2019-142464 A | 8/2019 |

OTHER PUBLICATIONS

International Search Report (PCT/ISA/210) issued in PCT Application No. PCT/JP2021/032873 dated Nov. 2, 2021 with English translation (five (5) pages).

Japanese-language Written Opinion (PCT/ISA/237) issued in PCT Application No. PCT/JP2021/032873 dated Nov. 2, 2021 (four (4) pages).

Extended European Search Report issued in European Application No. 21879783.5 dated Sep. 27, 2024 (9 pages).

* cited by examiner

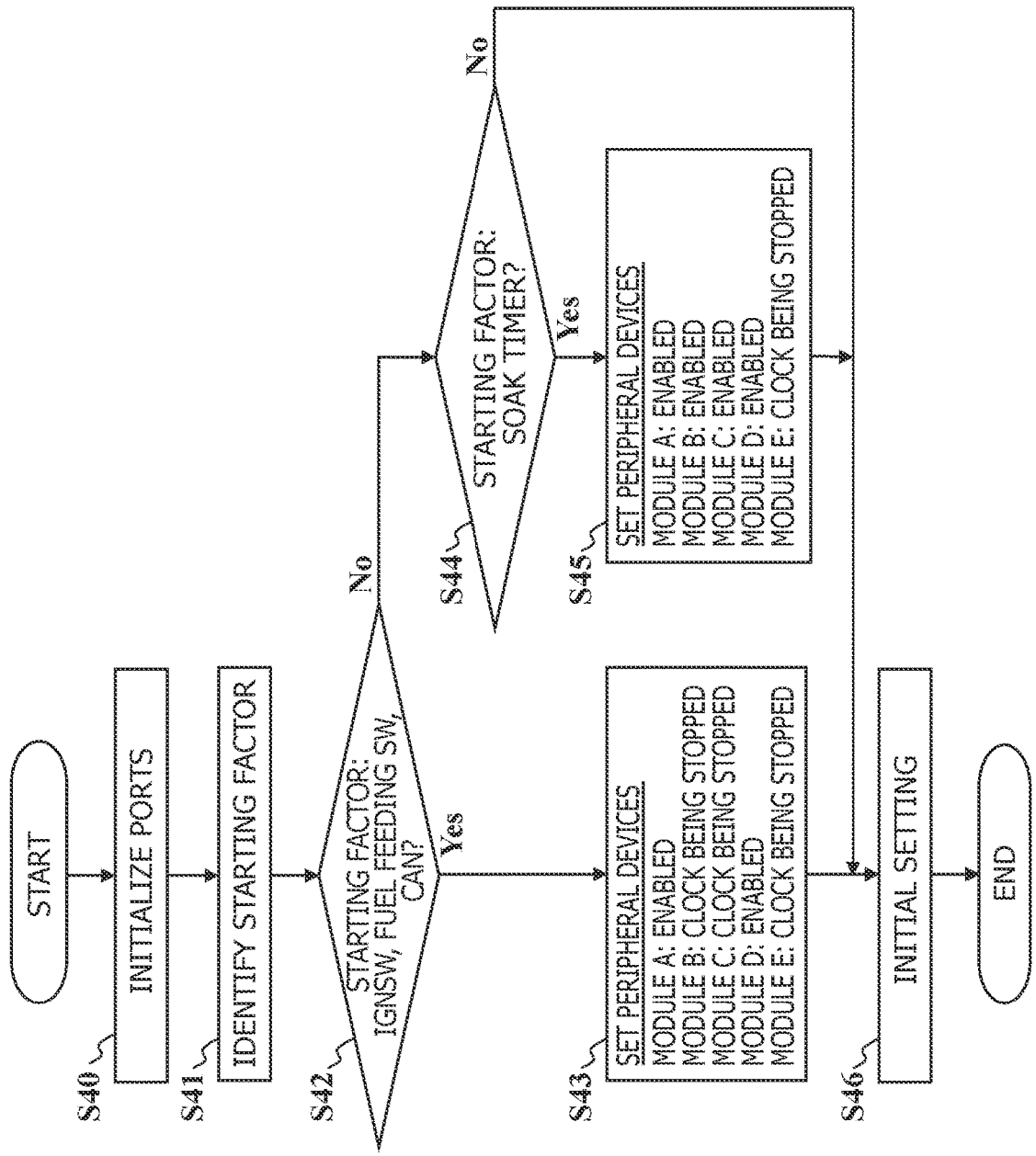

ELECTRONIC CONTROL UNIT AND METHOD FOR REDUCING POWER CONSUMPTION OF ELECTRONIC CONTROL UNIT

TECHNICAL FIELD

The present invention relates to an electronic control unit that is started by a plurality of starting factors, and to a method for reducing power consumption of an electronic control unit.

BACKGROUND ART

When evaporative fuel (evaporative emissions, which hereinafter may be abbreviated as "evap") in a fuel tank of an automobile is released into the atmosphere, hydrocarbons and nitrogen oxides react with ultraviolet light in sunlight, generating peroxides, thus causing photochemical smog. Therefore, an automobile is equipped with an evap purge system in which a canister is caused to temporarily adsorb evaporative emissions in a fuel tank, and when predetermined conditions are established, the evaporative emissions adsorbed within the canister are returned to an intake air system to be processed. In the evap purge system, there is a possibility of a leak of evaporative emissions due to a defect or the like. Therefore, an evaporative emission leak diagnosis is performed in which, after the lapse of a predetermined time period (for example, 6 hours after which fuel temperature and pressure become stable) from when an engine is stopped, the pressure in the canister is measured to diagnose whether evaporative emissions are leaking.

The evaporative emission leak diagnosis is performed for approximately 30 to 60 minutes during engine stop, and therefore, in order to ensure power required for restarting the engine, for example, it is necessary to reduce power consumed by an electronic control unit. To this end, a technique is proposed in which the microcomputer of an electronic control unit is shut down or goes into a sleep mode when the engine is stopped and, as described in JP 2008-269487 A (Patent Document 1), the microcomputer is started by a soak timer to perform evaporative emission leak diagnosis. In this proposed technique, by selecting a resource that corresponds to a plurality of starting factors, power consumption can be reduced and an operation mode corresponding to the starting factors can be executed.

REFERENCE DOCUMENT LIST

Patent Document

Patent Document 1: JP 2008-269487 A

SUMMARY OF THE INVENTION

Problem to be Solved by the Invention

As described above, the evaporative emission leak diagnosis is performed for approximately 30 to 60 minutes during engine stop, and therefore, there is a possibility that, during execution of evaporative emission leak diagnosis, the microcomputer will be required to start another operation mode due to another starting factor, for example, due to turning on of an ignition switch. At this point of operation, there is a concern that a resource selected based on a starting factor given by the soak timer may provide an insufficient capability to execute another operation mode.

In view of the above, it is an object of the present invention to provide an electronic control unit that can reduce power consumption and can manage a change in starting factor, and to provide a method for reducing power consumption of an electronic control unit.

Means for Solving the Problem

According to a first aspect of the present invention, an electronic control unit includes a microcomputer configured to be started by a plurality of starting factors, different operation modes are associated with each of the starting factors, and a resource is associated with each of the operation modes. The microcomputer is configured to identify a starting factor in an initialization process started by the starting factor, to select and execute an operation mode associated with the starting factor identified, and when another starting factor is generated during execution of the operation mode, the microcomputer is configured to stop execution of the operation mode and to restart to execute an operation mode associated with the other starting factor.

According to a second aspect of the present invention, an electronic control unit that includes a microcomputer started by a plurality of starting factors, different operation modes are associated with each of the starting factors, and a resource is associated with each of the operation modes. The microcomputer identifies a starting factor in an initialization process started by the starting factor, selects and executes an operation mode associated with the starting factor identified, and when another starting factor is generated during execution of the operation mode, the microcomputer stops execution of the operation mode and restarts to execute an operation mode associated with the other starting factor.

Effects of the Invention

According to the present invention, in an electronic control unit that is started by a plurality of starting factors, it is possible to reduce power consumption and to manage a change in starting factor.

BRIEF DESCRIPTION OF THE DRAWINGS

FIG. 16 is a flowchart showing one example of a second initialization process.

MODE FOR CARRYING OUT THE INVENTION

Hereinafter, an embodiment for carrying out the present invention will be described in detail with reference to attached drawings.

Figure 1:
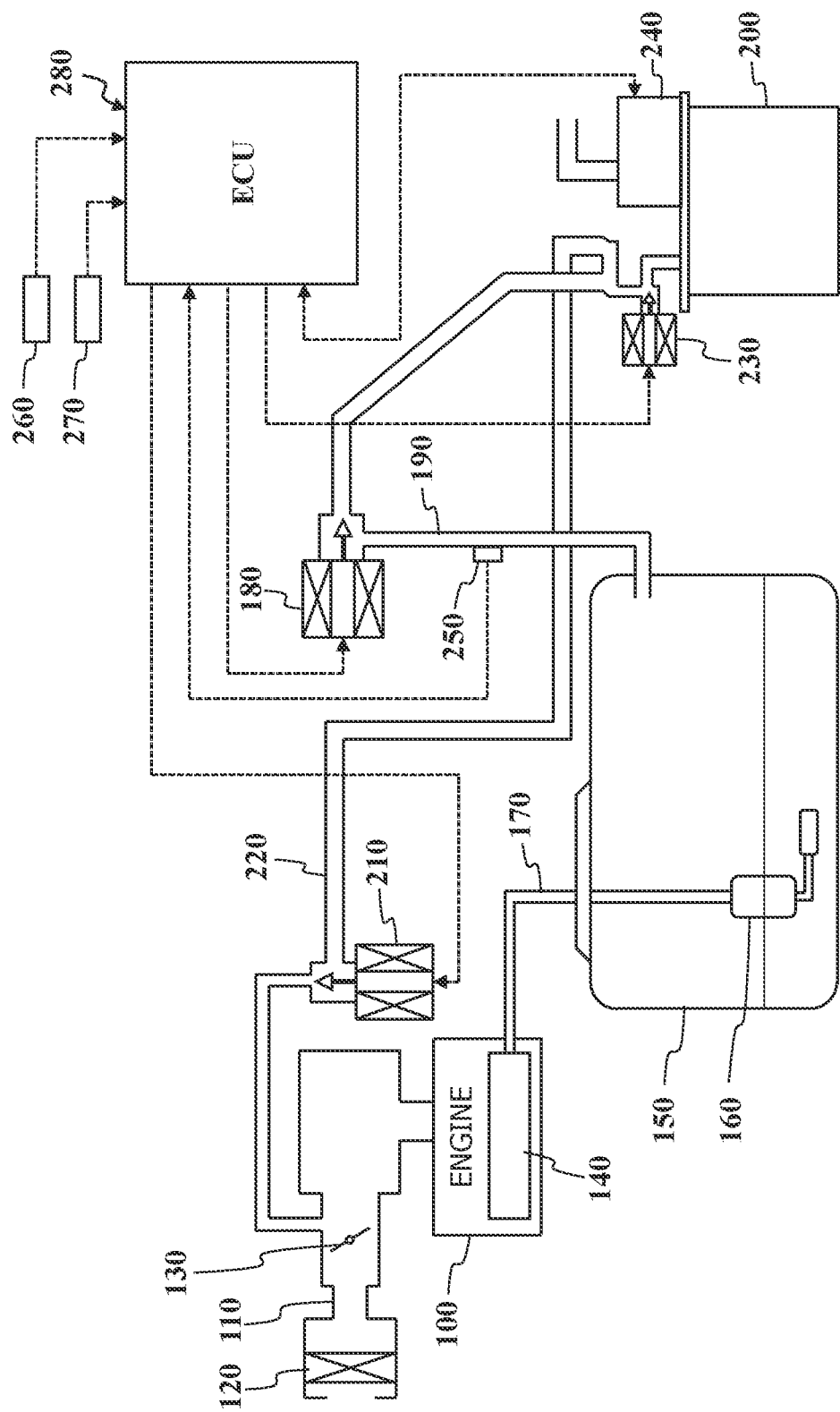
FIG. 1 is a schematic view showing one example of an engine system.

FIG. 1 shows one example of an engine system for a plug-in hybrid vehicle, an evap purge system being incorporated in the engine system to which this embodiment may be applied.

In an intake passage 110 of an engine 100, an air cleaner 120 and a throttle valve 130 are arranged, in this order, along the direction in which intake air flows, air cleaner 120 filtering out and removing dirt and dust in the intake air, and throttle valve 130 controlling an increase or a decrease in the flow rate of the intake air. A fuel injection device 140 is attached to engine 100, and injects fuel to an intake port or a cylinder not shown in the drawing. A fuel pump 160 is disposed at a bottom portion of a fuel tank 150, and draws and force-feeds fuel. The fuel force-fed from fuel pump 160 is supplied to fuel injection device 140 through a fuel supply passage 170. Of the fuel supplied to fuel injection device 140, surplus fuel that is not injected is returned to fuel tank 150 through a fuel return passage not shown in the drawing.

Evaporative emissions generated in fuel tank 150 pass through an evaporative emission passage 190, and is then introduced into a canister 200 that temporarily adsorbs the evaporative emissions by activated carbon, a sealing valve 180, which is a normally closed remote controllable solenoid valve, being disposed in evaporative emission passage 190. The evaporative emissions that are temporarily adsorbed by canister 200 pass through a purge passage 220, and is then returned to intake passage 110 at a position downstream of throttle valve 130, a purge valve 210, which is a normally closed remote controllable solenoid valve, being disposed in purge passage 220. The evaporative emissions that are returned to intake passage 110 is introduced into the combustion chamber of engine 100 together with intake air and is burned.

A bypass valve 230, which is a normally open remote controllable solenoid valve, is attached in the vicinity of canister 200, and exclusively switches between communication and cutting-off between evaporative emission passage 190 and purge passage 220, and canister 200. In short, bypass valve 230 is configured to exclusively open and close a passage (an introduction passage or a lead-out passage) to canister 200.

A leak diagnostic module 240 is attached to the predetermined portion of canister 200, and diagnoses whether evaporative emissions are leaking into the atmosphere. Leak diagnostic module 240 incorporates a negative pressure pump, a pressure sensor, an orifice, and a remote controllable selector valve not shown in the drawing. Leak diagnostic module 240 opens canister 200 to the atmosphere to purge evaporative emissions, and performs an evaporative emission leak diagnosis. Leak diagnostics module 240 is disclosed in JP 2019-142464 A, for example, thus being well-known, and therefore, detailed description of leak diagnostic module 240 will be omitted. Refer to JP 2019-142464 A if necessary.

Evaporative emission passage 190 is located between fuel tank 150 and sealing valve 180. A pressure sensor 250 is attached to evaporative emission passage 190, and is configured to measure pressure in the internal space of fuel tank 150. An ignition switch 260 and a fuel feeding switch 270 are attached at predetermined portions of the plug-in hybrid vehicle. Ignition switch 260 is manipulated to start or stop engine 100. Fuel feeding switch 270 is manipulated to feed fuel into fuel tank 150. Ignition switch 260 outputs an OFF signal (LOW signal) to stop engine 100, and outputs an ON signal (HIGH signal) to start engine 100. According to the manipulation state of fuel feeding switch 270, fuel feeding switch 270 outputs an OFF signal to not feed fuel into fuel tank 150, and outputs an ON signal to feed fuel into fuel tank 150.

Respective output signals from leak diagnostic module 240, pressure sensor 250, ignition switch 260, and fuel feeding switch 270 are input to an electronic control unit (ECU) 280 that electronically controls the evap purge system. Electronic control unit 280 is configured to output respective actuation signals to sealing valve 180, purge valve 210, bypass valve 230, and leak diagnostic module 240.

Figure 2:
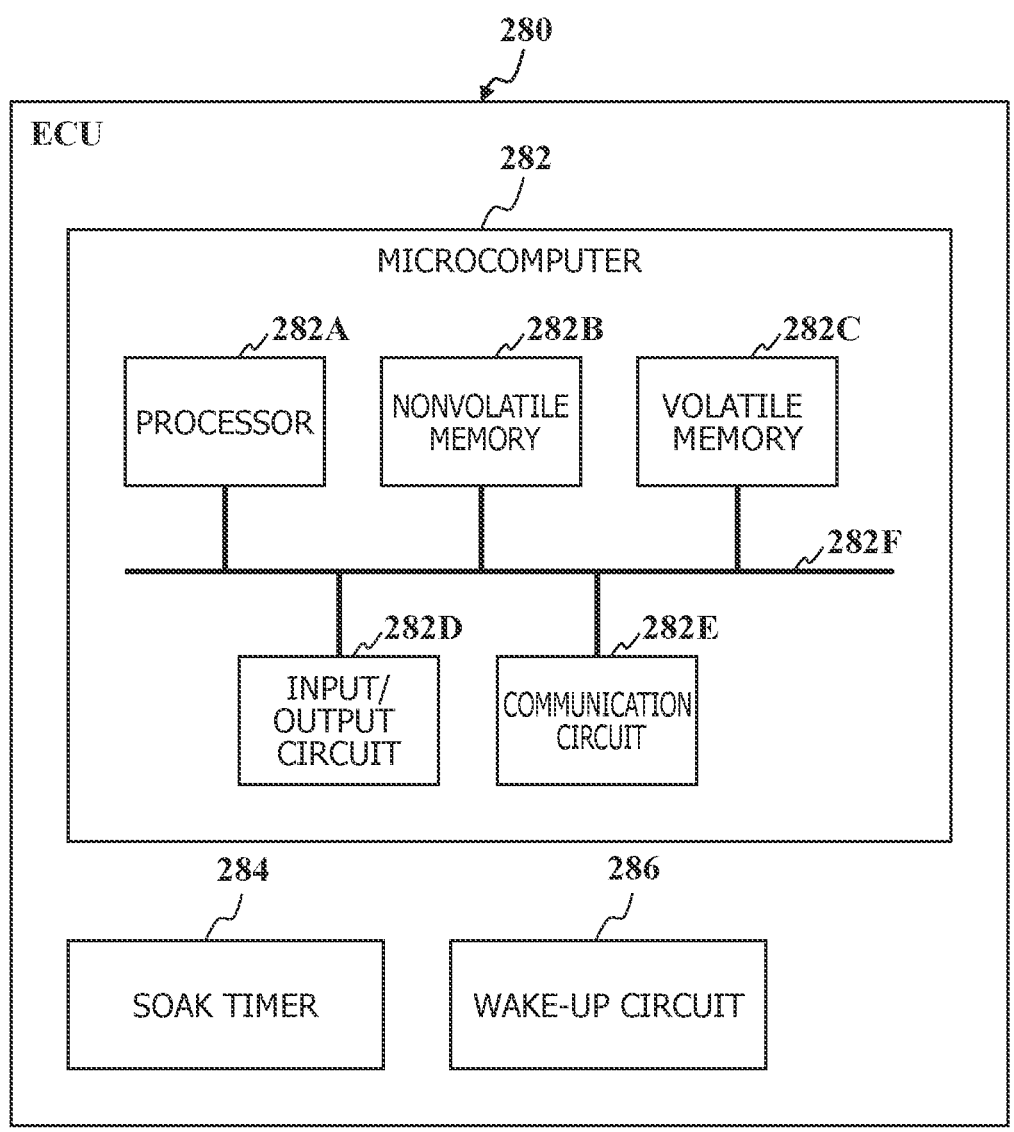
FIG. 2 is a schematic view showing one example of an electronic control unit.

As shown in FIG. 2, electronic control unit 280 includes a microcomputer 282, a soak timer 284, and a wake-up circuit 286.

Microcomputer 282 incorporates a processor 282A, such as a CPU (Central Processing Unit), a nonvolatile memory 282B, a volatile memory 282C, an input/output circuit 282D, a communication circuit 282E, and an internal bus 282F that connects these components in a mutually communicable manner. Communication circuit 282E is given as one example of a communication module.

Processor 282A is hardware that executes an instruction set (for example, transfer, arithmetic operation, processing, control, and management of data) described in an application program, and includes an arithmetic unit, a register that stores instructions and data, and peripheral circuits, for example. Nonvolatile memory 282B is a flash ROM (Read Only Memory), an EEPROM (Electrically Erasable Programmable Read Only Memory), or the like that can hold data even when supply of power is cut off, and nonvolatile memory 282B holds an application program (computer program) in which this embodiment is implemented, control data, learning values, and the like. Volatile memory 282C is a dynamic RAM (Random Access Memory) or the like in which data are lost when supply of power is cut off. Volatile memory 282C provides a storage area that temporarily holds data in the arithmetic process of processor 282A.

Input/output circuit 282D includes an A/D converter, a D/A converter, a D/D converter or the like, and provides a function of inputting/outputting an analog signal and a digital signal to and from the sensor, the switches, an actuator and the like. Communication circuit 282E includes a CAN (Controller Area Network) transceiver, for example, and provides a function of connecting to an on-vehicle network. Internal bus 282F is a path for exchanging data between respective devices, and includes an address bus, a data bus, and a control bus, the address bus transferring addresses, the data bus transferring data, the control bus sending and receiving control information and a timing at which input/output is actually performed through the address bus or the data bus.

Soak timer 284 includes a semiconductor integrated circuit, and it outputs an ON signal after the lapse of a predetermined time period from an input of a reset signal. Accordingly, soak timer 284 is reset when the engine is stopped, and therefore, soak timer 284 outputs an ON signal after the lapse of a predetermined time period from when the engine is stopped. Wake-up circuit 286 includes a semiconductor integrated circuit. When wake-up circuit 286 receives CAN packet, wake-up circuit 286 outputs an ON signal as a wake-up signal.

Processor 282A of microcomputer 282 electronically controls at least the evap purge system according to the application program stored in nonvolatile memory 282B. Specific control of the evap purge system will be described later.

Figure 3:
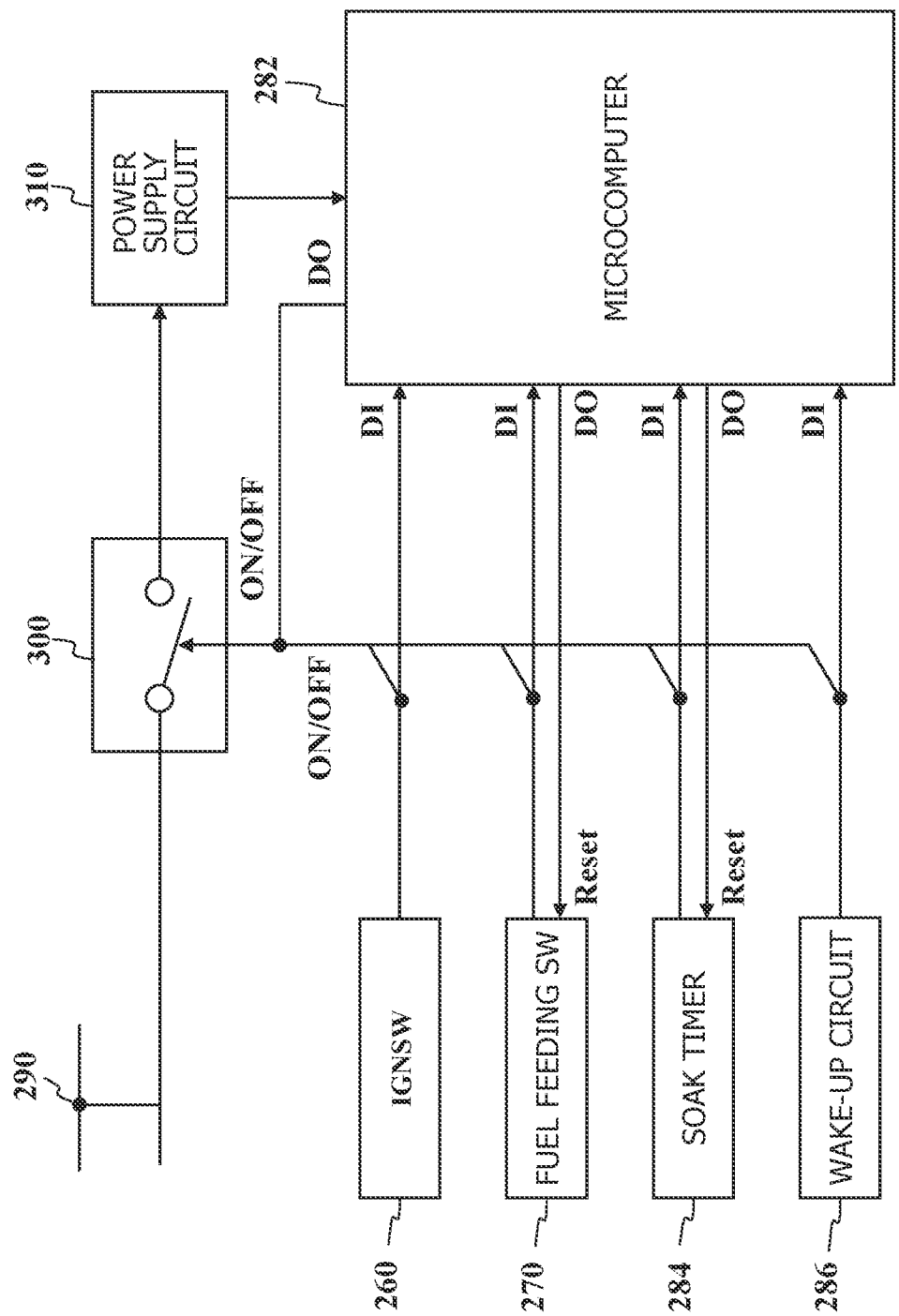
FIG. 3 is a schematic view showing one example of a starting circuit of a microcomputer.

FIG. 3 shows one example of a starting circuit that causes microcomputer 282 to be started by a plurality of starting factors.

Respective ON/OFF signals from ignition switch 260, fuel feeding switch 270, soak timer 284, and wake-up circuit 286 are input to microcomputer 282 via digital input ports DI of input/output circuit 282D. A battery 290, a power supply relay 300, and a power supply circuit 310 are disposed at predetermined portions in a plug-in hybrid vehicle, power supply relay 300 retaining power supply supplied from battery 290 to microcomputer 282, and power supply circuit 310 stabilizing the voltage of power supply supplied from battery 290.

Battery 290 is connected to one terminal of power supply relay 300. The other terminal of power supply relay 300 is connected to the power supply terminal of microcomputer 282 via power supply circuit 310. An ignition switch 260, fuel feeding switch 270, soak timer 284, and wake-up circuit 286 are connected to the coil not shown in the drawing of power supply relay 300. Accordingly, when an ON signal is supplied from ignition switch 260, fuel feeding switch 270, soak timer 284, or wake-up circuit 286, the coil is actuated, so that power supply relay 300 is turned on and starts supply of power from battery 290 to microcomputer 282. When supply of power from battery 290 to microcomputer 282 is started, microcomputer 282 is started and an initialization process is performed. At this point of operation, by continuously outputting an ON signal from digital output port DO of input/output circuit 282D to power supply relay 300, microcomputer 282 can retain power supplied from battery 290.

Furthermore, by outputting an OFF signal from digital output port DO of input/output circuit 282D to power supply relay 300 in a state in which power supply relay 300 retains a power supply, microcomputer 282 can turn off power supply relay 300, thus being shut down. Microcomputer 282 is configured to be able to output reset signals to fuel feeding switch 270 and soak timer 284 via digital output ports DO of input/output circuit 282D.

The operation modes of microcomputer 282 include at least a power-off mode, a purge mode, a fuel feeding mode, a leak diagnostic mode, and a CAN response mode, an ON signal from ignition switch 260 being used as a starting factor for the purge mode, an ON signal from fuel feeding switch 270 being used as a starting factor for the fuel feeding mode, an ON signal from soak timer 284 being used as a starting factor for the leak diagnostic mode, and an ON signal from wake-up circuit 286 being used as a starting factor for the CAN response mode. That is, in this embodiment, microcomputer 282 is configured to be started by four starting factors.

Figure 4:
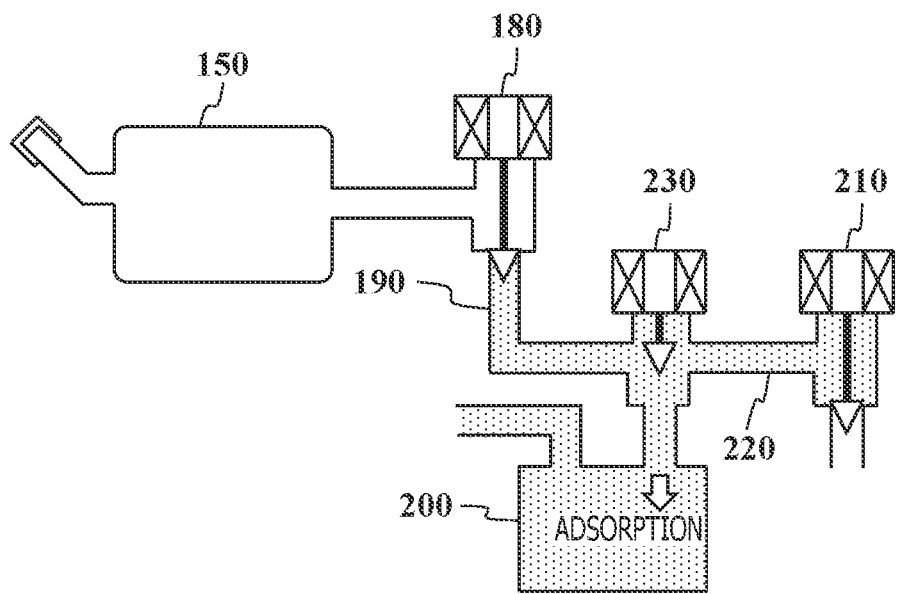
FIG. 4 is a diagram describing the control state of an evap purge system in a power-off mode, a leak diagnostic mode, or a CAN response mode.

In the power-off mode, microcomputer 282 is in a stop state or in a sleep state, and actuation signals are not output to normally closed sealing valve 180, normally closed purge valve 210, and normally open bypass valve 230. Therefore, in the power-off mode, as shown in FIG. 4, evaporative emission passage 190 is closed by sealing valve 180, purge passage 220 is closed by purge valve 210, and the passage to canister 200 is opened by bypass valve 230. Although not clearly shown in FIG. 4, the selector valve and the negative pressure pump of leak diagnostic module 240 are in a non-actuated state, and therefore, canister 200 is prevented from being opened to the atmosphere. Accordingly, the internal space of canister 200 is in a sealed state, and therefore, unless canister 200 or the like has a defect, it is possible to suppress release of evaporative emissions into the atmosphere.

Figure 5:
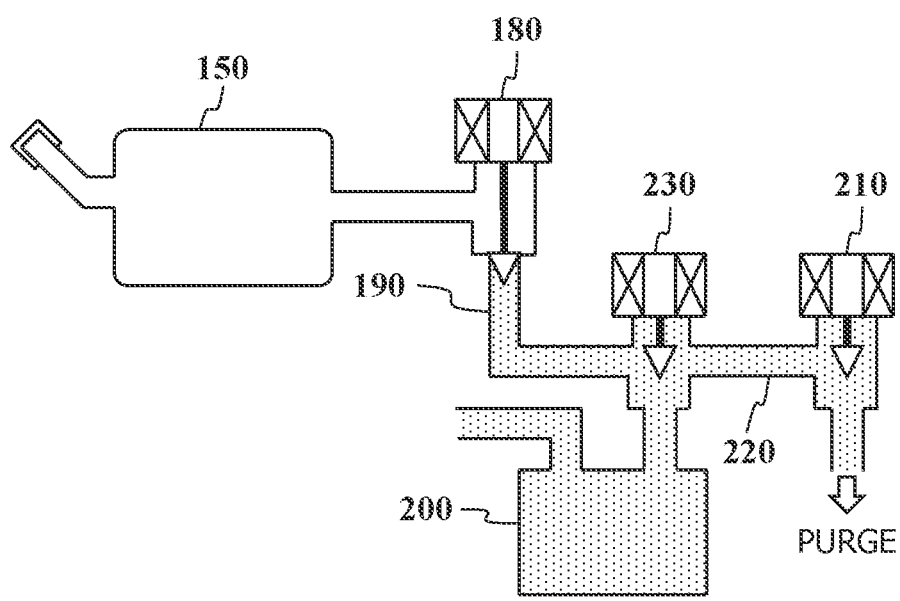
FIG. 5 is a diagram describing the control state of the evap purge system in a purge mode.

In the purge mode, when engine 100 is in neither an idling state nor a warmup state, for example, as shown in FIG. 5, microcomputer 282 outputs an actuation signal to normally closed purge valve 210 to open normally closed purge valve 210. At this point of operation, it is unnecessary for microcomputer 282 to output actuation signals to normally closed sealing valve 180 and normally open bypass valve 230. Therefore, in the purge mode, as shown in FIG. 5, evaporative emission passage 190 is closed by sealing valve 180, purge passage 220 is opened by purge valve 210, and the passage to canister 200 is opened by bypass valve 230. Although not clearly shown in FIG. 5, microcomputer 282 opens the internal space of canister 200 to the atmosphere by suitably controlling leak diagnostic module 240. Accordingly, when a negative pressure is generated on the downstream of throttle valve 130, evaporative emissions temporarily adsorbed by canister 200 are returned to intake passage 110 through purge passage 220, are introduced into the combustion chamber and is processed together with intake air.

Figure 6:
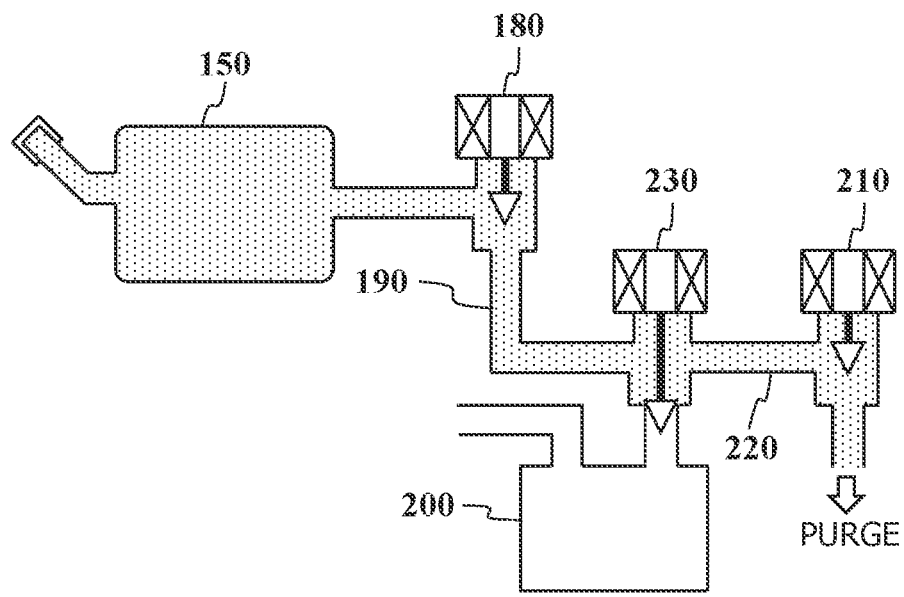
FIG. 6 is a diagram describing the control state of the evap purge system in the case in which the internal pressure in a fuel tank becomes high in the purge mode.

During the execution of the purge mode, microcomputer 282 monitors output signals from pressure sensor 250. When the pressure measured by pressure sensor 250 is higher than a predetermined pressure, microcomputer 282 outputs actuation signals to normally closed sealing valve 180 and normally open bypass valve 230 in addition to normally closed purge valve 210. In this state, as shown in FIG. 6, evaporative emission passage 190 is opened by sealing valve 180, purge passage 220 is opened by purge valve 210, and the passage to canister 200 is closed by bypass valve 230. Accordingly, when a negative pressure is generated on the downstream of throttle valve 130, evaporative emissions in fuel tank 150 are returned to intake passage 110 through evaporative emission passage 190 and purge passage 220, is introduced into the combustion chamber and is processed together with intake air. When the pressure measured by pressure sensor 250 drops to the predetermined pressure, microcomputer 282 cancels an output of actuation signals to normally closed sealing valve 180 and normally open bypass valve 230 in order to restore normally closed sealing valve 180 and normally open bypass valve 230 to the states shown in FIG. 5.

Figure 7:
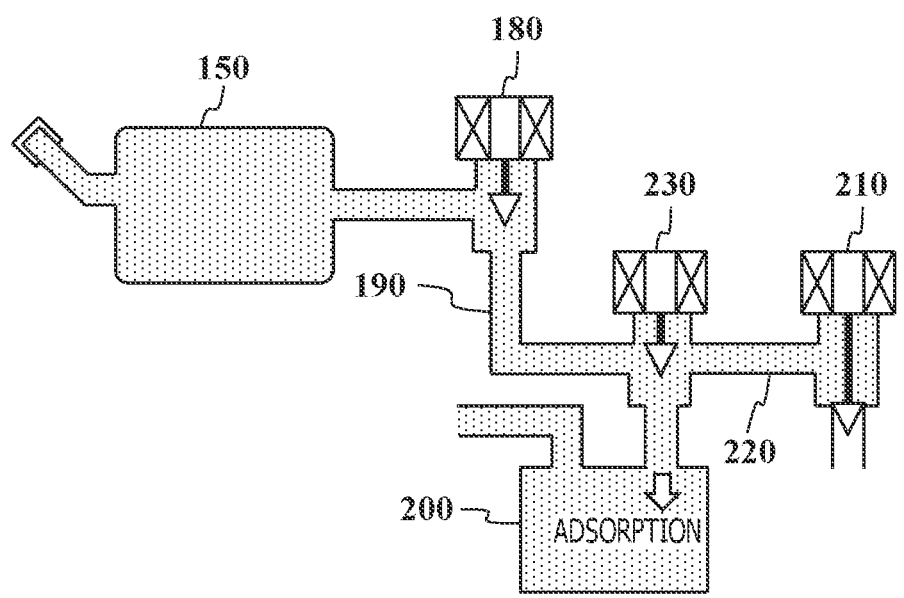
FIG. 7 is a diagram describing the control state of the evap purge system in a fuel feeding mode.

In the fuel feeding mode, microcomputer 282 outputs an actuation signal to normally closed sealing valve 180 to open normally closed sealing valve 180. At this point of operation, it is unnecessary for microcomputer 282 to output actuation signals to normally closed purge valve 210 and normally open bypass valve 230. Therefore, in the fuel feeding mode, as shown in FIG. 7, evaporative emission passage 190 is opened by sealing valve 180, purge passage 220 is closed by purge valve 210, and the passage to canister 200 is opened by bypass valve 230. Although not clearly shown in FIG. 7, microcomputer 282 prevents the internal space of canister 200 from being opened to the atmosphere by suitably controlling leak diagnostic module 240. Accordingly, evaporative emissions in fuel tank 150 are introduced into canister 200 through evaporative emission passage 190 and are temporarily adsorbed, and therefore, it is possible to minimize a situation in which evaporative emissions are released into the atmosphere due to the fuel feeding operation.

In the leak diagnostic mode, microcomputer 282 does not output actuation signals to normally closed sealing valve 180, normally closed purge valve 210, and normally open bypass valve 230 so that, as shown in FIG. 4, sealing valve 180 is in a closed state, purge valve 210 is in a closed state, and bypass valve 230 is in an open state. Microcomputer 282 suitably controls leak diagnostic module 240 with the internal space of canister 200 remaining in a sealed state, and diagnoses, based on an output signal from the pressure sensor of leak diagnostic module 240, whether evaporative emissions are leaking into the atmosphere. When microcomputer 282 diagnoses that evaporative emissions are leaking into the atmosphere, a warning lamp may be turned on or failure information may be written in nonvolatile memory 282B.

In the CAN response mode, microcomputer 282 does not output actuation signals to normally closed sealing valve 180, normally closed purge valve 210, and normally open bypass valve 230 so that, as shown in FIG. 4, sealing valve 180 is in a closed state, purge valve 210 is in a closed state, and bypass valve 230 is in an open state. Although not clearly shown in FIG. 4, microcomputer 282 brings the selector valve and the negative pressure pump of leak diagnostic module 240 into a non-actuated state to prevent canister 200 from being opened to the atmosphere. Microcomputer 282 performs processing that uses a reception of CAN packet as a starting factor, for example, performs processing of rewriting the application program or control data stored in nonvolatile memory 282B.

Figure 8:
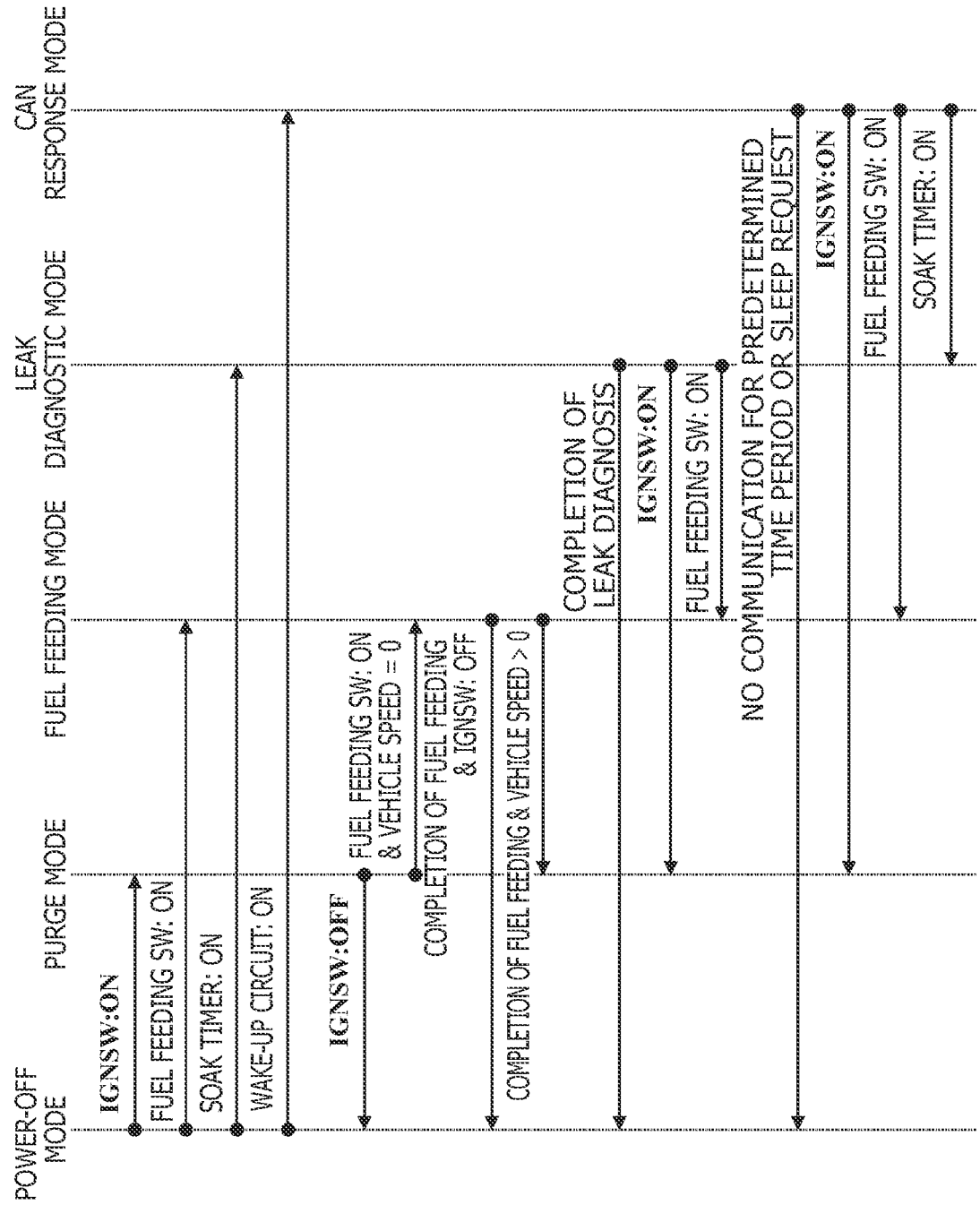
FIG. 8 is a diagram describing conditions for transition between respective operation modes.

FIG. 8 shows conditions for transition to the power-off mode, the purge mode, the fuel feeding mode, the leak diagnostic mode, or the CAN response mode. Note that transition to each operation mode shown in FIG. 8 is merely one example, and it does not always occur as shown in the drawing.

When an ON signal is output from ignition switch 260 in the power-off mode, microcomputer 282 is started and executes the purge mode. When an ON signal is output from fuel feeding switch 270 in the power-off mode, microcomputer 282 is started and executes the fuel feeding mode. When an ON signal is output from soak timer 284 in the power-off mode, microcomputer 282 is started and executes the leak diagnostic mode. When an ON signal is output from wake-up circuit 286 in the power-off mode, microcomputer 282 is started and executes the CAN response mode.

When an OFF signal is output from ignition switch 260 during the execution of the purge mode, microcomputer 282 cancels the execution of the purge mode and performs a self-shutdown process and, thereafter, stops an output of an actuation signal to power supply relay 300 to transition to the power-off mode. When an ON signal is output from fuel feeding switch 270 and a vehicle speed becomes zero during the execution of the purge mode, microcomputer 282 cancels the execution of the purge mode, and transitions to the fuel feeding mode.

When fuel feeding is completed and an OFF signal is output from ignition switch 260 during execution of the fuel feeding mode, microcomputer 282 cancels the execution of the fuel feeding mode and performs the self-shutdown process and, thereafter, stops an output of an actuation signal to power supply relay 300 to transition to the power-off mode. When fuel feeding is completed and a vehicle speed becomes greater than zero, that is, traveling of the plug-in hybrid vehicle is started, during the execution of the fuel feeding mode, microcomputer 282 cancels the execution of the fuel feeding mode and transitions to the purge mode.

When a leak diagnosis is completed during the execution of the leak diagnostic mode, microcomputer 282 cancels the execution of the leak diagnostic mode and performs the self-shutdown process and, thereafter, stops an output of an actuation signal to power supply relay 300 to transition to the power-off mode. When an ON signal is output from ignition switch 260 during the execution of the leak diagnostic mode, microcomputer 282 cancels the execution of the leak diagnostic mode and transitions to the purge mode. When an ON signal is output from fuel feeding switch 270 during the execution of the leak diagnostic mode, microcomputer 282 cancels the execution of the leak diagnostic mode and transitions to the fuel feeding mode.

When no communication is made for a predetermined time period or a sleep request is made during the execution of the CAN response mode, microcomputer 282 cancels the execution of the CAN response mode and performs the self-shutdown process and, thereafter, stops an output of an actuation signal to power supply relay 300 to transition to the power-off mode. When an ON signal is output from ignition switch 260 during the execution of the CAN response mode, microcomputer 282 cancels the execution of the CAN response mode and transitions to the purge mode. When an ON signal is output from fuel feeding switch 270 during the execution of the CAN response mode, microcomputer 282 cancels the execution of the CAN response mode and transitions to the fuel feeding mode. When an ON signal is output from soak timer 284 during the execution of the CAN response mode, microcomputer 282 cancels the execution of the CAN response mode and transitions to the leak diagnostic mode.

Microcomputer 282 is active in the purge mode, the fuel feeding mode, the leak diagnostic mode, and the CAN response mode, and each operation mode requires a different resource to execute each operation mode. In this embodiment, examples of the resource include an operation clock supplied to processor 282A of microcomputer 282, the voltage of analog power supply supplied to microcomputer 282, and various peripheral devices of microcomputer 282. In the case in which the execution of an operation mode is started by selecting a resource corresponding to a starting factor as in the case of a conventional technique, when another starting factor is generated thereafter, there may be cases in which a resource required for executing an operation mode corresponding to another starting factor becomes insufficient, so that a required function cannot be exhibited. In view of the above, this embodiment allows electronic control unit 280 to reduce power consumption and to manage a change in the starting factor by the method described below.

Figure 9:
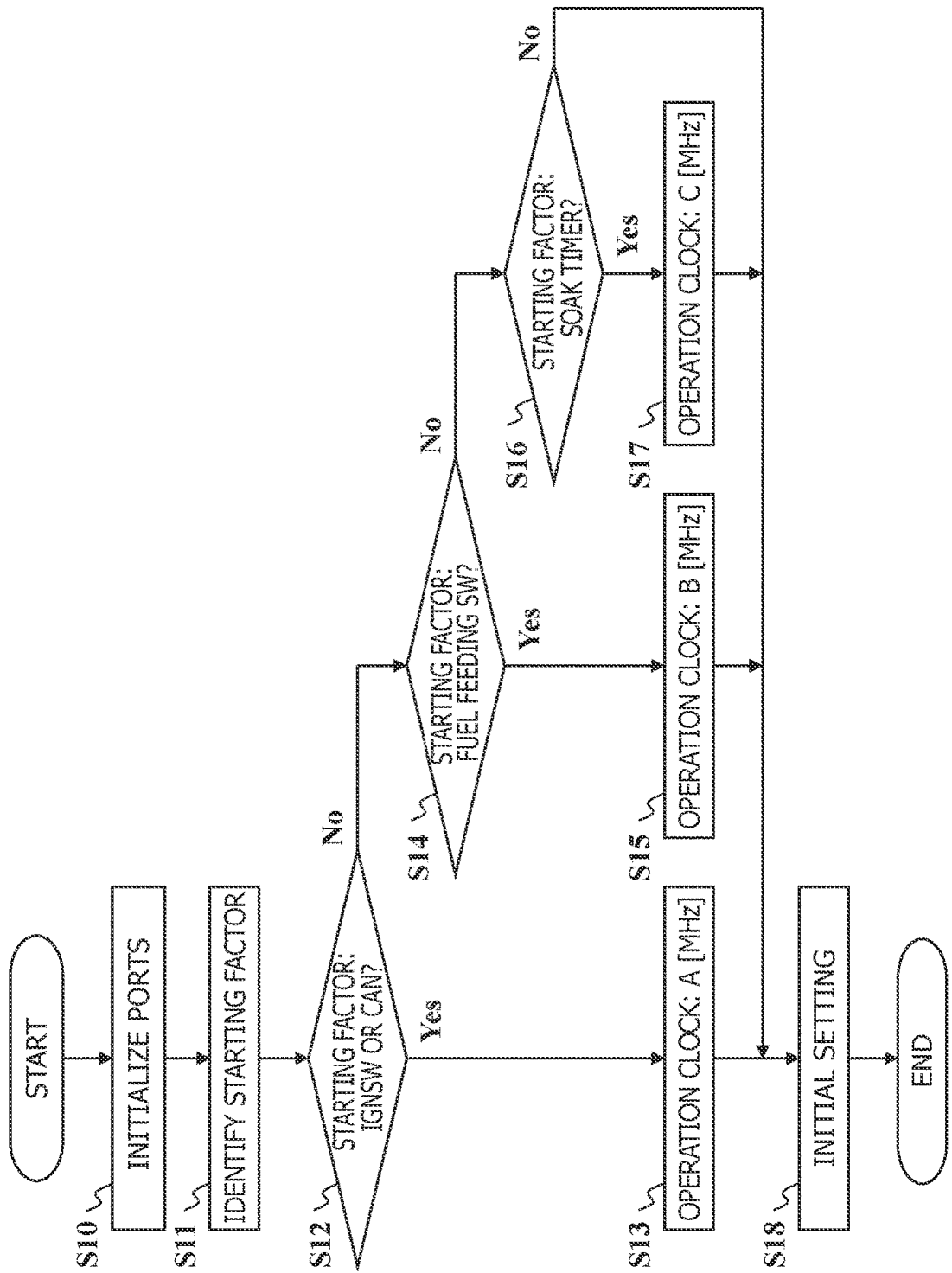
FIG. 9 is a flowchart showing one example of a first initialization process.

FIG. 9 shows one example of a first initialization process performed by processor 282A of microcomputer 282 using a start of microcomputer 282 by any one of the plurality of starting factors as a trigger. Processor 282A of microcomputer 282 performs the first initialization process according to the application program stored in nonvolatile memory 282B.

In step 10 (abbreviated as "S10" in FIG. 9. The same applies hereinafter), processor 282A of microcomputer 282 initializes the flip-flop or the register of input/output circuit 282D to allow digital ports to be used as digital input ports.

In step 11, processor 282A of microcomputer 282 identifies, based on which digital input port receives an input of an ON signal, which starting factor of the plurality of starting factors causes microcomputer 282 to be started.

In step 12, processor 282A of microcomputer 282 determines whether the starting factor is an ON signal from ignition switch 260 or an ON signal from wake-up circuit 286. When processor 282A of microcomputer 282 determines that the starting factor is an ON signal from ignition switch 260 or an ON signal from wake-up circuit 286 (Yes), processor 282A of microcomputer 282 advances the process to step 13. In contrast, when processor 282A of microcomputer 282 determines that the starting factor is not an ON signal from ignition switch 260, and is not an ON signal from wake-up circuit 286 (No), processor 282A of microcomputer 282 advances the process to step 14.

In step 13, processor 282A of microcomputer 282 sets an operation clock supplied to processor 282A to A [MHz], for example, at which the maximum capacity can be exhibited. Thereafter, processor 282A of microcomputer 282 advances the process to step 18.

In step 14, processor 282A of microcomputer 282 determines whether the starting factor is an ON signal from fuel feeding switch 270. When processor 282A of microcomputer 282 determines that the starting factor is an ON signal from fuel feeding switch 270 (Yes), processor 282A of microcomputer 282 advances the process to step 15. In contrast, when processor 282A of microcomputer 282 determines that the starting factor is not an ON signal from fuel feeding switch 270 (No), processor 282A of microcomputer 282 advances the process to step 16.

In step 15, processor 282A of microcomputer 282 sets an operation clock supplied to processor 282A to B [MHz], being lower than A [MHz], for example. Thereafter, processor 282A of microcomputer 282 advances the process to step 18. The operation clock B [MHz] may be set to a frequency required for executing the fuel feeding mode, for example.

In step 16, processor 282A of microcomputer 282 determines whether the starting factor is an ON signal from soak timer 284. When processor 282A of microcomputer 282 determines that the starting factor is an ON signal from soak timer 284 (Yes), processor 282A of microcomputer 282 advances the process to step 17. In contrast, when processor 282A of microcomputer 282 determines that the starting factor is not an ON signal from soak timer 284 (No), processor 282A of microcomputer 282 advances the process to step 18.

In step 17, processor 282A of microcomputer 282 sets an operation clock supplied to processor 282A to C [MHz], being lower than B [MHz], for example. Thereafter, processor 282A of microcomputer 282 advances the process to step 18. The operation clock C [MHz] may be set to a frequency required for executing the leak diagnostic mode, for example.

In step 18, processor 282A of microcomputer 282 performs initial setting that is required for executing at least each operation mode. Thereafter, processor 282A of microcomputer 282 ends the first initialization process, and performs a process for each operation mode.

In the first initialization process, when the starting factor is an ON signal from ignition switch 260 or wake-up circuit 286, processor 282A of microcomputer 282 sets the operation clock to A [MHz]. When the starting factor is an ON signal from fuel feeding switch 270, processor 282A of microcomputer 282 sets the operation clock to B [MHz]. When the starting factor is an ON signal from soak timer 284, processor 282A of microcomputer 282 sets the operation clock to C [MHz]. Accordingly, an operation clock is set that is one example of a resource required for executing an operation mode associated with a plurality of starting factors and therefore, there is no possibility of resources becoming insufficient for microcomputer 282. Therefore, it is possible to exhibit a function required for each operation mode.

Figure 10:
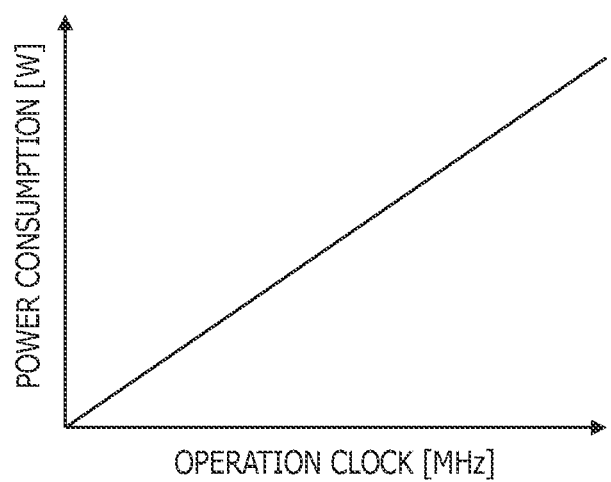
FIG. 10 is a diagram describing the relationship between operation clock and power consumption.

As shown in FIG. 10, power consumption of microcomputer 282 substantially linearly increases as an operation clock is increased. Accordingly, by appropriately setting an operation clock required for executing each operation mode, it is possible to exhibit a function required for each operation mode and to reduce power consumption of microcomputer 282.

In FIG. 9, when the starting factor is an ON signal from ignition switch 260 or wake-up circuit 286, processor 282A of microcomputer 282 sets an operation clock to A [MHz]. However, a configuration may be adopted in which when the starting factor is an ON signal from ignition switch 260, processor 282A of microcomputer 282 sets an operation clock to A1 [MHz], and when the starting factor is an ON signal from wake-up circuit 286, processor 282A of microcomputer 282 sets an operation clock to A2 (A2≠A1) [MHz]. With such a configuration, an operation clock required for executing each operation mode is set more finely, and therefore, compared with the previous embodiment, it is possible to further reduce power consumption of microcomputer 282.

Figure 11:
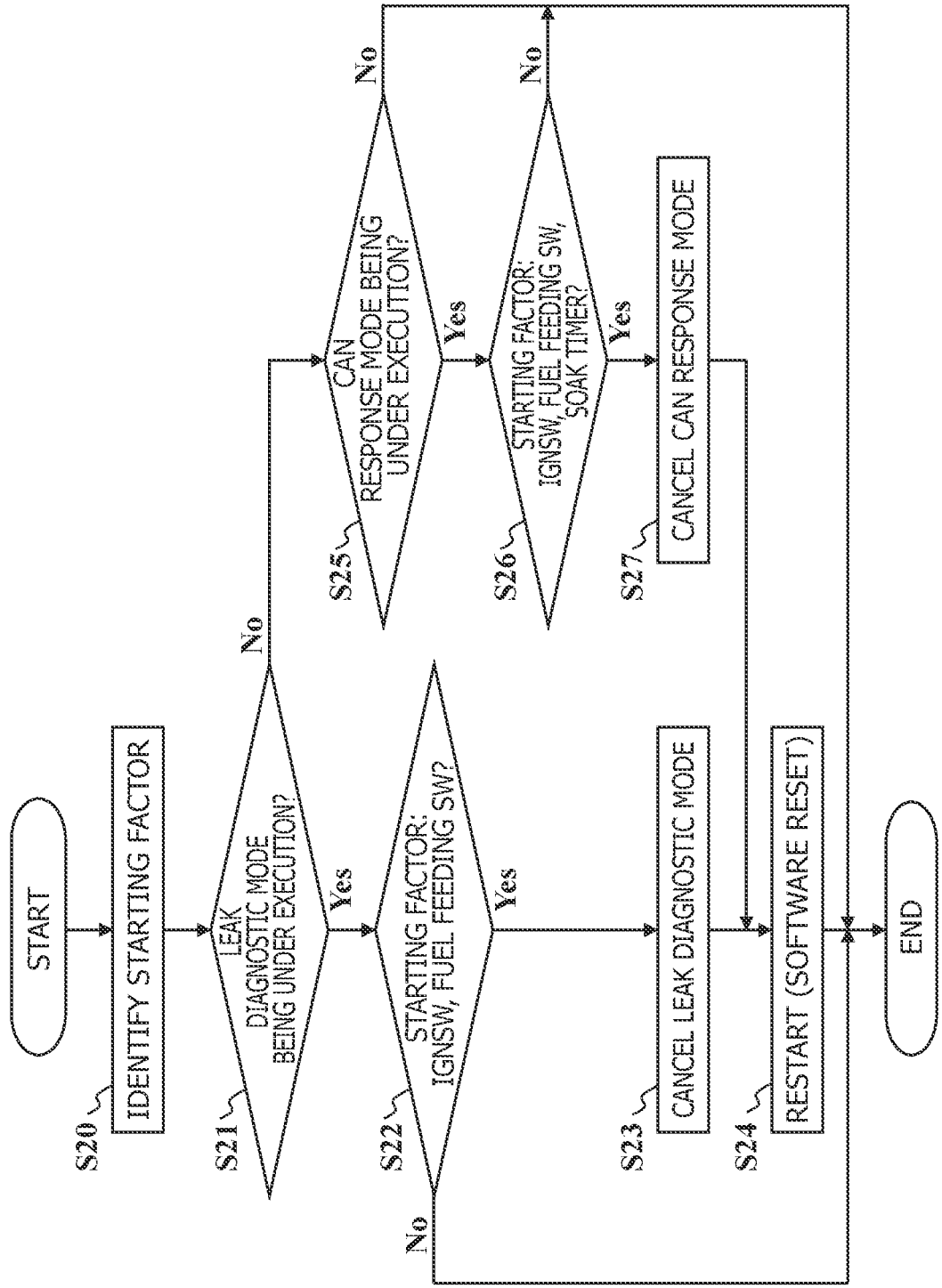
FIG. 11 is a flowchart showing one example of a mode switching process.

FIG. 11 shows one example of a mode switching process performed by processor 282A of microcomputer 282 using the generation of another starting factor during the execution of each operation mode as a trigger. Processor 282A of microcomputer 282 performs the mode switching process according to the application program stored in nonvolatile memory 282B.

In step 20, processor 282A of microcomputer 282 identifies, based on which digital input port receives an input of an ON signal, which starting factor of the plurality of starting factors is newly generated.

In step 21, processor 282A of microcomputer 282 determines whether the leak diagnostic mode is under execution. When processor 282A of microcomputer 282 determines that the leak diagnostic mode is under execution (Yes), processor 282A of microcomputer 282 advances the process to step 22. In contrast, when processor 282A of microcomputer 282 determines that the leak diagnostic mode is not under execution (No), processor 282A of microcomputer 282 advances the process to step 25.

In step 22, processor 282A of microcomputer 282 determines whether the starting factor is an ON signal from ignition switch 260 or fuel feeding switch 270. When processor 282A of microcomputer 282 determines that the starting factor is an ON signal from ignition switch 260 or fuel feeding switch 270 (Yes), processor 282A of microcomputer 282 advances the process to step 23. In contrast, when processor 282A of microcomputer 282 determines that the starting factor is not an ON signal from ignition switch 260 and is not an ON signal from fuel feeding switch 270 (No), processor 282A of microcomputer 282 ends the mode switching process.

In step 23, processor 282A of microcomputer 282 cancels the execution of the leak diagnostic mode. At this point of operation, processor 282A of microcomputer 282 may output a reset signal to soak timer 284 to allow the leak diagnostic mode to be executed again after the lapse of a predetermined time period.

In step 24, processor 282A of microcomputer 282 causes itself to be restarted by software reset, for example, to switch an operation mode to an operation mode associated with a newly generated starting factor. When microcomputer 282 restarts, the first initialization process shown in FIG. 9 is performed, the resource associated with the starting factor is selected, and the operation mode is executed.

In step 25, processor 282A of microcomputer 282 determines whether the CAN response mode is under execution. When processor 282A of microcomputer 282 determines that the CAN response mode is under execution (Yes), processor 282A of microcomputer 282 advances the process to step 26. In contrast, when processor 282A of microcomputer 282 determines that the CAN response mode is not being executed (No), processor 282A of microcomputer 282 ends the mode switching process.

In step 26, processor 282A of microcomputer 282 determines whether the starting factor is an ON signal from ignition switch 260, fuel feeding switch 270, or soak timer 284. When processor 282A of microcomputer 282 determines that the starting factor is an ON signal from ignition switch 260, fuel feeding switch 270, or soak timer 284 (Yes), processor 282A of microcomputer 282 advances the process to step 27. In contrast, when processor 282A of microcomputer 282 determines that the starting factor is not an ON signal from ignition switch 260, is not an ON signal from fuel feeding switch 270, and is not an ON signal from soak timer 284 (No), processor 282A of microcomputer 282 ends the mode switching process.

In step 27, processor 282A of microcomputer 282 cancels the execution of the CAN response mode. Thereafter, processor 282A of microcomputer 282 advances the process to step 24 to switch an operation mode to an operation mode associated with a newly generated starting factor.

In the mode switching process, when an ON signal is output from ignition switch 260 or fuel feeding switch 270 during the execution of the leak diagnostic mode, processor 282A of microcomputer 282 cancels the execution of the leak diagnostic mode and causes itself to be restarted. When an ON signal is output from ignition switch 260, fuel feeding switch 270, or soak timer 284 during the execution of the CAN response mode, processor 282A of microcomputer 282 cancels the execution of the CAN response mode and causes itself to be restarted. When processor 282A of microcomputer 282 is restarted, thus performing the first initialization process, the operation mode can be switched to an operation mode associated with a newly generated starting factor. Accordingly, it is possible to manage a change in starting factor.

In the case in which the operation clock associated with the operation mode under execution is equal to or less than a predetermined frequency, processor 282A of microcomputer 282 may be configured to monitor whether another starting factor is generated during the execution of the operation mode. That is, when the operation clock supplied to processor 282A is A [MHz], at which the maximum capacity can be exhibited, every operation mode is executable, and therefore, there is no possibility of a failure occurring even when the operation mode is directly switched. In the case in which another starting factor is generated during the execution of the operation mode and the load of the operation mode under execution is lower than the load of an operation mode associated with another starting factor, processor 282A of microcomputer 282 may be configured to stop the execution of the operation mode under execution and restarts. With such a configuration, it is possible to decrease the frequency of changing an operation clock in switching an operation mode.

Figure 12:
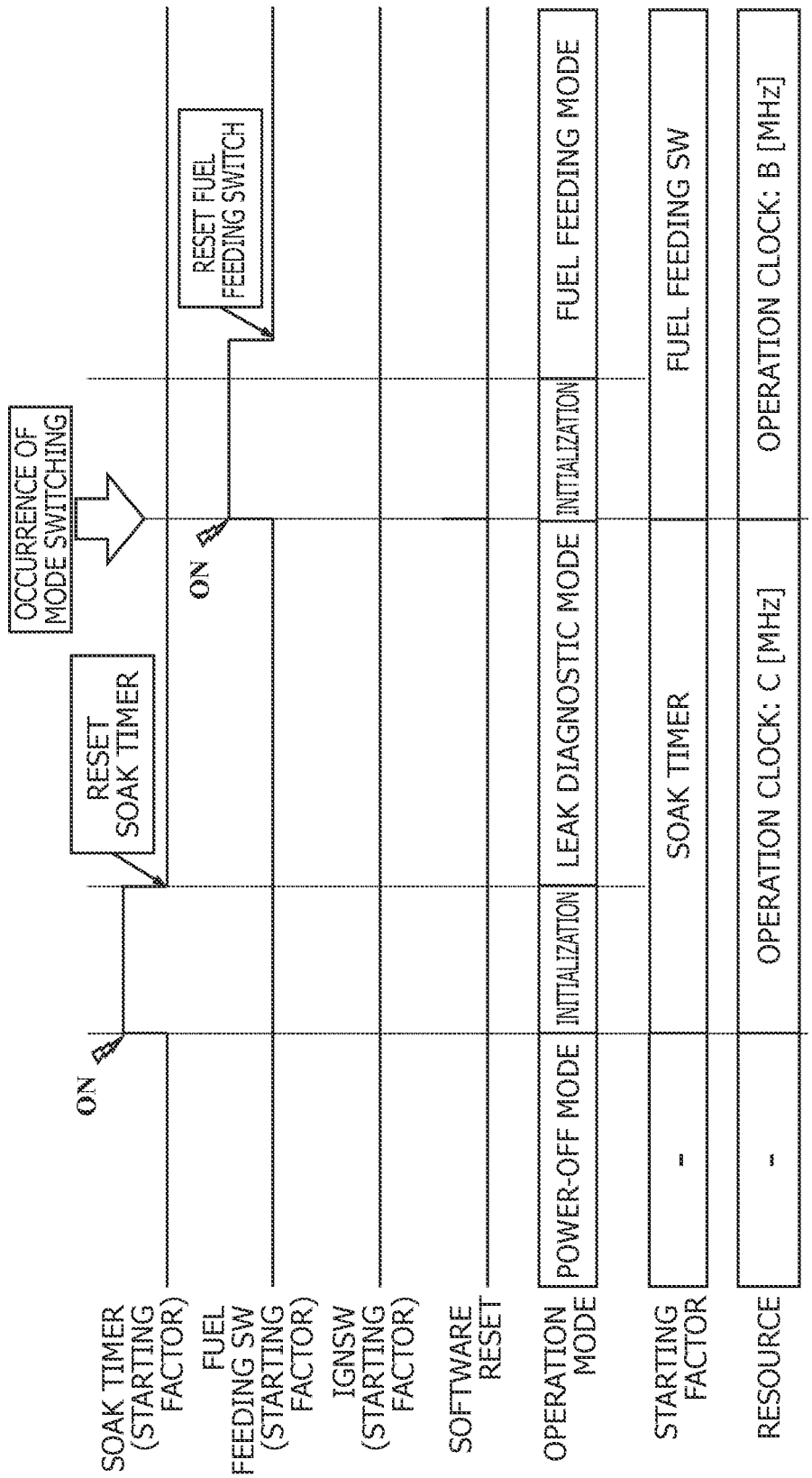
FIG. 12 is a diagram describing the mode switching process when a specific case is anticipated.

To facilitate understanding of the mode switching process, switching of an operation mode will be described by taking a specific case shown in FIG. 12 as an example.

When an ON signal is output from soak timer 284 in the power-off mode in which microcomputer 282 is in a stopped state, supply of power from battery 290 to microcomputer 282 is started, and therefore, microcomputer 282 is started and the first initialization process is performed. In the first initialization process, an operation clock supplied to processor 282A is set to C [MHz] that is required for executing the leak diagnostic mode. When the first initialization process is completed, the operation mode is transitioned from the power-off mode to the leak diagnostic mode. At the same time, soak timer 284 is reset, so that soak timer 284 starts to output an OFF signal.

When an ON signal is output from fuel feeding switch 270 during the execution of the leak diagnostic mode, the execution of the leak diagnostic mode is canceled, and the first initialization process is performed using a software reset as a trigger. In the first initialization process, an operation clock supplied to processor 282A is set to B [MHz] that is required for executing the fuel feeding mode. When the first initialization process is completed, the operation mode is transitioned from the leak diagnostic mode to the fuel feeding mode. After the lapse of a predetermined time period from the transition to the fuel feeding mode, fuel feeding switch 270 is reset, so that fuel feeding switch 270 starts to output an OFF signal.

The operation mode is switched from the leak diagnostic mode to the fuel feeding mode in this manner. Note that the above-mentioned description is merely one example, and it should not be construed that the operation mode is switched as described above.

Figure 13:
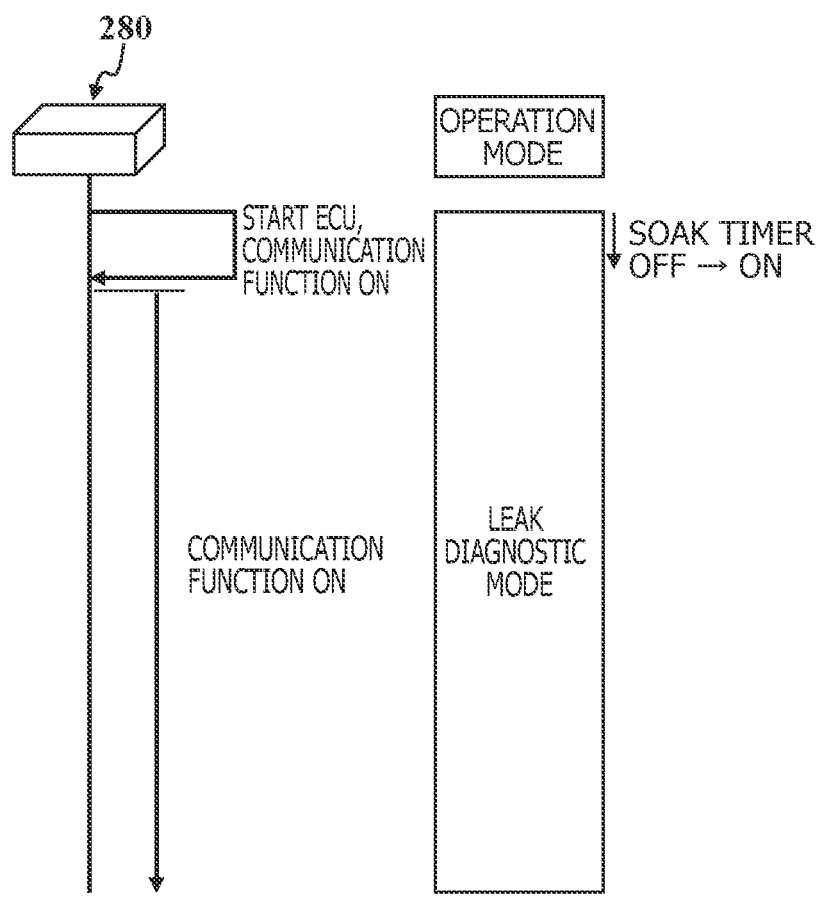
FIG. 13 is a diagram describing the control state of a communication function in a conventional technique.

As shown in FIG. 13, for example, when an ON signal is output from soak timer 284, microcomputer 282 of electronic control unit 280 is started and executes the leak diagnostic mode. In the conventional technique, at this point of operation, electronic control unit 280 executes the leak diagnostic mode with a communication function, which communicates with another electronic control unit, remaining in an ON (enabled) state, specifically, with communication circuit 282E remaining in an ON (enabled) state, regardless of the fact that another electronic control unit is not active. Accordingly, power is also consumed by communication circuit 282E during the execution of the leak diagnostic mode, thus wastefully consuming power.

Figure 14:
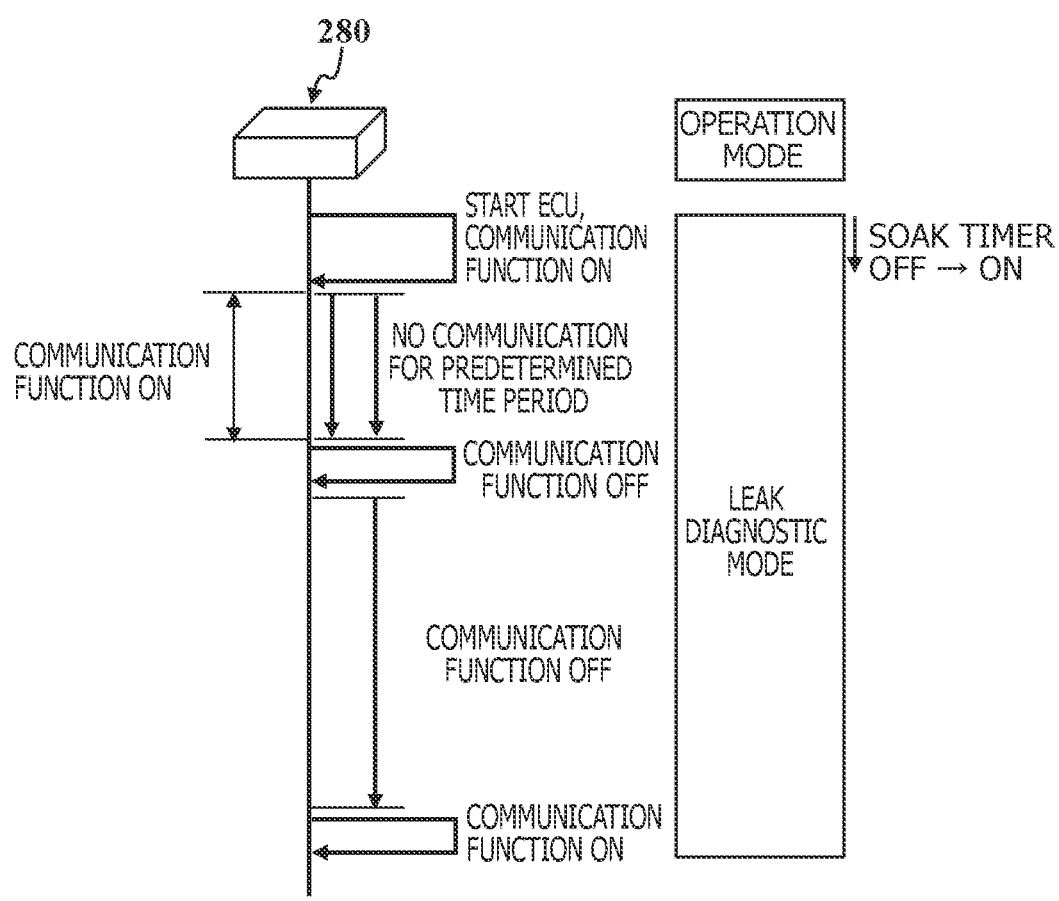
FIG. 14 is a diagram describing the control state of a communication function in this embodiment.

In view of the above, as shown in FIG. 14, processor 282A of microcomputer 282 monitors, for example, the transmission buffer and the reception buffer of communication circuit 282E during the execution of the leak diagnostic mode. When no communication is made with another electronic control unit for a predetermined time period, processor 282A of microcomputer 282 stops an operation clock supplied to communication circuit 282E, which is one example of the communication function. With such a configuration, communication circuit 282E is stopped during the execution of the leak diagnostic mode, and therefore, power consumed by communication circuit 282E is zero, leading to a further reduction in power consumption.

In the case in which another electronic control unit is to communicate with electronic control unit 280 for some reason, a wake-up signal may be output to electronic control unit 280, for example, to enable communication circuit 282E. An operation mode in which communication circuit 282E is stopped is not limited to the leak diagnostic mode, and communication circuit 282E may also be stopped in the fuel feeding mode or the CAN response mode.

Figure 15:
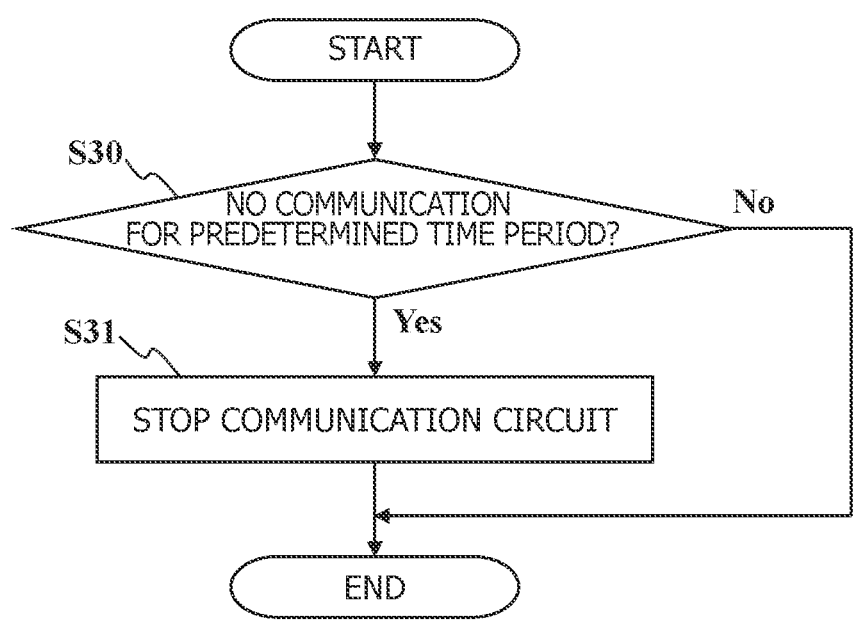
FIG. 15 is a flowchart showing one example of a communication function stop process.

FIG. 15 shows one example of a communication function stop process that is repeatedly performed by processor 282A of microcomputer 282 every predetermined time period using a start of the execution of the fuel feeding mode, the leak diagnostic mode, or the CAN response mode as a trigger. In the communication function stop process, a timer is started at the time of starting each operation mode.

In step 30, processor 282A of microcomputer 282 refers to the timer to determine whether communication is made with another electronic control unit for a predetermined time period. When processor 282A of microcomputer 282 determines that no communication is made with another electronic control unit for the predetermined time period (Yes), processor 282A of microcomputer 282 advances the process to step 31. In contrast, when processor 282A of microcomputer 282 determines that communication is made with another electronic control unit for the predetermined time period (No), processor 282A of microcomputer 282 ends the communication function stop process in the current control cycle.

In step 31, processor 282A of microcomputer 282 stops, for example, an operation clock supplied to communication circuit 282E to stop communication circuit 282E. Thereafter, processor 282A of microcomputer 282 ends the communication function stop process in the current control cycle.

FIG. 16 shows one example of a second initialization process performed by processor 282A of microcomputer 282 using a start of microcomputer 282 by any one of the plurality of starting factors as a trigger. Processor 282A of microcomputer 282 performs the second initialization process according to the application program stored in nonvolatile memory 282B.

In step 40, processor 282A of microcomputer 282 initializes the flip-flop or the register of input/output circuit 282D to allow digital ports to be used as digital input ports.

In step 41, processor 282A of microcomputer 282 identifies, based on which digital input port receives an input of an ON signal, which starting factor of the plurality of starting factors caused microcomputer 282 to be started.

In step 42, processor 282A of microcomputer 282 determines whether the starting factor is an ON signal from ignition switch 260, fuel feeding switch 270, or wake-up circuit 286. When processor 282A of microcomputer 282 determines that the starting factor is an ON signal from any one of ignition switch 260, fuel feeding switch 270, or wake-up circuit 286 (Yes), processor 282A of microcomputer 282 advances the process to step 43. In contrast, when processor 282A of microcomputer 282 determines that the starting factor is not an ON signal from ignition switch 260, not an ON signal from fuel feeding switch 270, and not an ON signal from wake-up circuit 286 (No), processor 282A of microcomputer 282 advances the process to step 44.

In step 43, processor 282A of microcomputer 282 sets whether to enable or disenable respective peripheral devices, such as the timer and a power device, under conditions under which the purge mode, the fuel feeding mode, or the CAN response mode is executable. In the example shown in the drawing, processor 282A of microcomputer 282 enables modules A and D, and stops operation clocks supplied to modules B, C, and E to disenable the modules B, C, and E. However, note that the enabled state and the disenabled state of the modules A to E are not limited to the above. Thereafter, processor 282A of microcomputer 282 advances the process to step 46.

In step 44, processor 282A of microcomputer 282 determines whether the starting factor is an ON signal from soak timer 284. When processor 282A of microcomputer 282 determines that the starting factor is an ON signal from soak timer 284 (Yes), processor 282A of microcomputer 282 advances the process to step 45. In contrast, when processor 282A of microcomputer 282 determines that the starting factor is not an ON signal from soak timer 284 (No), processor 282A of microcomputer 282 advances the process to step 46.

In step 45, processor 282A of microcomputer 282 sets whether to enable or disenable respective peripheral devices, such as the timer and the power device, under conditions under which the leak diagnostic mode is executable. In the example shown in the drawing, processor 282A of microcomputer 282 enables the modules A to D, and stops an operation clock supplied to the module E to disenable the module E. However, note that the enabled state and the disenabled state of the modules A to E are not limited to the above. Thereafter, processor 282A of microcomputer 282 advances the process to step 46.

In step 46, processor 282A of microcomputer 282 performs initial setting that is required for executing at least each operation mode. Thereafter, processor 282A of microcomputer 282 ends the second initialization process, and performs a process for each operation mode.

In the second initialization process, when the starting factor is an ON signal from ignition switch 260, fuel feeding switch 270, or wake-up circuit 286, processor 282A of microcomputer 282 enables the modules A and D, serving as the peripheral devices, and stops the modules B, C, and E. When the starting factor is an ON signal from soak timer 284, processor 282A of microcomputer 282 enables the modules A to D, serving as the peripheral devices, and stops the module E. Accordingly, when an operation mode associated with a plurality of starting factors is executed, a peripheral device, which is one example of the resource required for executing the operation mode, is selected, and therefore, there is no possibility of insufficient resources for microcomputer 282. Therefore, it is possible to perform a function required for each operation mode.

In the above-mentioned embodiment, when the starting factor is an ON signal from ignition switch 260, fuel feeding switch 270, or wake-up circuit 286, the same peripheral device is selected. However, consideration may be given to the peripheral device required for each operation mode, and a different peripheral device may be selected for each operation mode. Furthermore, the modules serving as the peripheral devices are not limited to the modules A to E. Consideration may be given to the module required for executing each operation mode, and the module may be suitably defined.

To reduce power consumption of electronic control unit 280, power supply supplied from power supply circuit 310 to microcomputer 282, that is, the voltage of analog power supply, may be switched according to a starting factor.

In a method for switching the voltage of an analog power supply, when microcomputer 282 identifies the starting factor, the starting factor is sent to power supply circuit 310, and power supply circuit 310 switches, according to the starting factor, the voltage of analog power supply supplied to microcomputer 282. It is sufficient to set this voltage of analog power supply to a voltage at which the operation mode associated with the starting factor is executable (the same applies hereinafter).

In another method for switching the voltage of an analog power supply, power supply circuit 310 includes a circuit that receives an input of an ON signal and an OFF signal from ignition switch 260, fuel feeding switch 270, soak timer 284, or wake-up circuit 286, thus being capable of identifying the starting factor, and power supply circuit 310 switches the voltage of analog power supply supplied to microcomputer 282 according to the identification result.

With such a configuration, the voltage of analog power supply supplied to microcomputer 282 can be switched under conditions under which the operation mode associated with the starting factor is executable, and therefore, it is possible to further reduce power consumption of electronic control unit 280.

It can be easily understood that those skilled in the art can create new embodiments by omitting a portion of, by suitably combining portions of, or replacing with a well-known technique, a portion of technical concepts of the above-mentioned various embodiments.

One example of the new embodiment is as follows. The resource for microcomputer 282 is not limited to either one of an operation clock supplied to processor 282A or a peripheral device, and it may be both the operation clock and the peripheral device. Furthermore, an object to which this embodiment is applied is not limited to the evap purge system, and may be any of various systems mounted in an automobile, such as an engine control system or a transmission control system. In addition to the above, a vehicle to which this embodiment is applicable is not limited to a plug-in hybrid vehicle, and it may be applicable to a hybrid vehicle, a common vehicle or the like.

REFERENCE SYMBOL LIST

180 sealing valve
190 evaporative emission passage
200 canister
210 purge valve
220 purge passage
230 bypass valve
240 leak diagnostic module
260 ignition switch
280 electronic control unit
282 microcomputer
282A processor
282E communication circuit (communication module)
284 soak timer
310 power supply circuit

The invention claimed is:

1. An electronic control unit comprising a microcomputer configured to be started by a plurality of starting factors, wherein
different operation modes are associated with each of the starting factors, and a resource is associated with each of the operation modes, and
the microcomputer is configured to identify a starting factor in an initialization process started by the starting factor, to select and execute an operation mode associated with the identified starting factor, and when another starting factor is generated during execution of the operation mode, the microcomputer is configured to stop execution of the operation mode and to restart to execute an operation mode associated with the other starting factor;
wherein each of the resources includes an operation clock supplied to a processor of the microcomputer;
wherein in a case in which the operation clock is equal to or less than a predetermined frequency the microcomputer is configured to monitor whether the other starting factor is generated during the execution of the operation mode associated with the identified starting factor;
wherein a first operation clock, which is one of the operation clocks, is associated with one of the operation modes; and
wherein the predetermined frequency is less than a frequency of the first operation clock.

2. The electronic control unit according to claim 1, wherein the resource includes a peripheral device in addition to the operation clock.

3. The electronic control unit according to claim 1, wherein in a case in which the other starting factor is generated during the execution of the operation mode, when a load of the operation mode is lower than a load of the operation mode associated with the other starting factor, the microcomputer is configured to stop the execution of the operation mode and restarts.

4. The electronic control unit according to claim 1, wherein the microcomputer is configured to stop a communication module in a case in which no communication is made for a predetermined time period.

5. The electronic control unit according to claim 4, wherein the microcomputer is configured to stop the communication module by stopping supply of an operation clock to the communication module.

6. The electronic control unit according to claim 1, further comprising a power supply circuit configured to switch, according to the starting factor, an analog power supply voltage which is supplied to the microcomputer.

7. The electronic control unit according to claim 1, wherein the starting factors include manipulation of an ignition switch and an output from a soak timer.

8. The electronic control unit according to claim 1, wherein the microcomputer is configured to control a system that processes an evaporative emission.

9. A method for reducing power consumption of an electronic control unit that includes a microcomputer started by a plurality of starting factors, different operation modes being associated with each of the starting factors, a resource being associated with each of the operation modes,
wherein the microcomputer identifies a starting factor in an initialization process started by the starting factor, selects and executes an operation mode associated with the identified starting factor, and when another starting factor is generated during execution of the operation mode, the microcomputer stops execution of the operation mode and restarts to execute an operation mode associated with the other starting factor;
wherein each of the resources includes an operation clock supplied to a processor of the microcomputer;
wherein in a case in which the operation clock is equal to or less than a predetermined frequency, the microcomputer monitors whether the other starting factor is generated during the execution of the operation mode associated with the identified starting factor;
wherein a first operation clock, which is one of the operation clocks, is associated with one of the operation modes; and
wherein the predetermined frequency is less than a frequency of the first operation clock.

10. The method for reducing power consumption of an electronic control unit according to claim 9, wherein the resource includes a peripheral device in addition to the operation clock.

11. The method for reducing power consumption of an electronic control unit according to claim 9, wherein in a case in which the other starting factor is generated during the execution of the operation mode, when a load of the operation mode is lower than a load of the operation mode associated with the other starting factor, the microcomputer stops the execution of the operation mode and restarts.

12. The method for reducing power consumption of an electronic control unit according to claim 9, wherein the microcomputer stops a communication module in a case in which no communication is made for a predetermined time period.

13. The method for reducing power consumption of an electronic control unit according to claim 12, wherein the microcomputer stops the communication module by stopping supply of an operation clock to the communication module.

14. The method for reducing power consumption of an electronic control unit according to claim 9, wherein the electronic control unit further includes a power supply circuit which switch, according to the starting factor, an analog power supply voltage supplied to the microcomputer.

15. The method for reducing power consumption of an electronic control unit according to claim 9, wherein the starting factors include manipulation of an ignition switch and an output from a soak timer.

16. The method for reducing power consumption of an electronic control unit according to claim 9, wherein the microcomputer controls a system that processes an evaporative emission.

17. The electronic control unit according to claim 1, wherein the predetermined frequency is less than a frequency at which a maximum capacity of the processor can be exhibited.

18. The method for reducing power consumption of an electronic control unit according to claim 9, wherein the predetermined frequency is less than a frequency at which a maximum capacity of the processor can be exhibited.

* * * * *